(12) United States Patent
Thrift

(10) Patent No.: US 7,931,430 B2
(45) Date of Patent: Apr. 26, 2011

(54) SWAGABLE WASHER LOCKING PLATE

(75) Inventor: Phil Thrift, Revesby (AU)

(73) Assignee: Advanced Building Systems Pty Ltd, Revesby, New South Wales (AU)

( * ) Notice: Subject to any disclaimer, the term of this patent is extended or adjusted under 35 U.S.C. 154(b) by 477 days.

(21) Appl. No.: 12/067,506

(22) PCT Filed: Sep. 19, 2006

(86) PCT No.: PCT/AU2006/001371
§ 371 (c)(1),
(2), (4) Date: Mar. 20, 2008

(87) PCT Pub. No.: WO2007/033411
PCT Pub. Date: Mar. 29, 2007

(65) Prior Publication Data
US 2008/0226415 A1    Sep. 18, 2008

(30) Foreign Application Priority Data
Sep. 23, 2005    (AU) .............................. 2005905270

(51) Int. Cl.
*F16B 39/10*    (2006.01)
*F16B 37/14*    (2006.01)

(52) U.S. Cl. ..................... 411/121; 411/129; 411/372.6; 411/431

(58) Field of Classification Search .......... 411/119–121, 411/129–131, 372.6, 431
See application file for complete search history.

(56) References Cited

U.S. PATENT DOCUMENTS

| 172,967 | A | * | 2/1876 | Carpenter | 411/130 |
|---|---|---|---|---|---|
| 586,024 | A | | 7/1897 | Gabriel | |
| 793,088 | A | | 6/1905 | Pariso | |
| 801,024 | A | * | 10/1905 | Lauffer | 411/130 |
| 900,202 | A | * | 10/1908 | Pugh | 411/130 |
| 952,283 | A | * | 3/1910 | Steckman | 411/120 |
| 971,637 | A | | 10/1910 | Rankin | |
| 1,379,607 | A | | 5/1921 | Ashley | |
| 2,642,108 | A | * | 6/1953 | Geistert | 411/130 |
| 3,135,558 | A | | 6/1964 | Johnston, Jr. et al. | |
| 4,050,494 | A | | 9/1977 | de Claire | |
| 5,362,111 | A | * | 11/1994 | Harbin | 285/92 |
| 5,538,377 | A | * | 7/1996 | Stewart et al. | 411/174 |
| 6,270,302 | B1 | * | 8/2001 | Lyons | 411/8 |

FOREIGN PATENT DOCUMENTS

| GB | 429266 A | 5/1935 |
|---|---|---|
| GB | 2261272 A | 5/1993 |
| WO | 0250459 A | 6/2002 |
| WO | 2004113743 A | 12/2004 |

* cited by examiner

Primary Examiner — Flemming Saether
(74) Attorney, Agent, or Firm — Richard M. Goldberg

(57) ABSTRACT

A locking device for a rotational based fastener for fastening an object to a substrate, the device including a washer for placement between the fastener head and the object a locking plate for removable engagement to the fastener head to prevent relative rotation of the locking plate and the fastener head, and a flexible, substantially non-elastic integral folded tab connecting the locking plate and washer, the locking plate has a first aperture to receive the the fastener shank such that the fastener head will upon tightening draw the washer into tight contact with the substrate, the locking plate is larger than the fastener head and has a second aperture of smaller or equal size than the fastener head, and the locking plate includes a swagable portion near the perimeter of the second aperture to bridge the fastener head when the locking plate is swaged over the fastener.

9 Claims, 3 Drawing Sheets

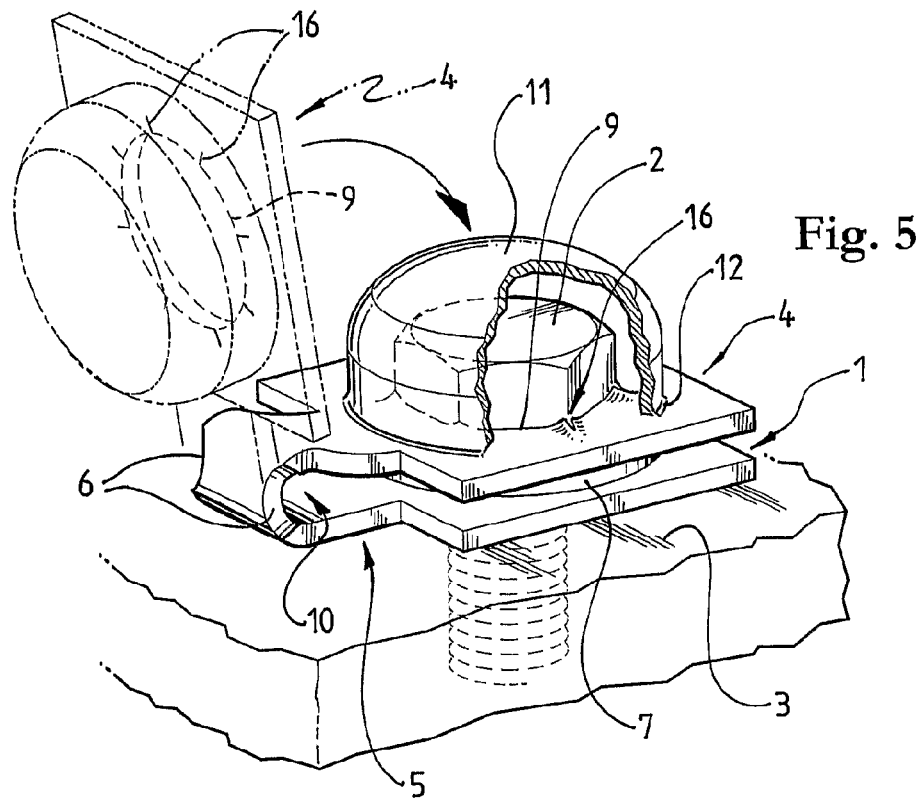
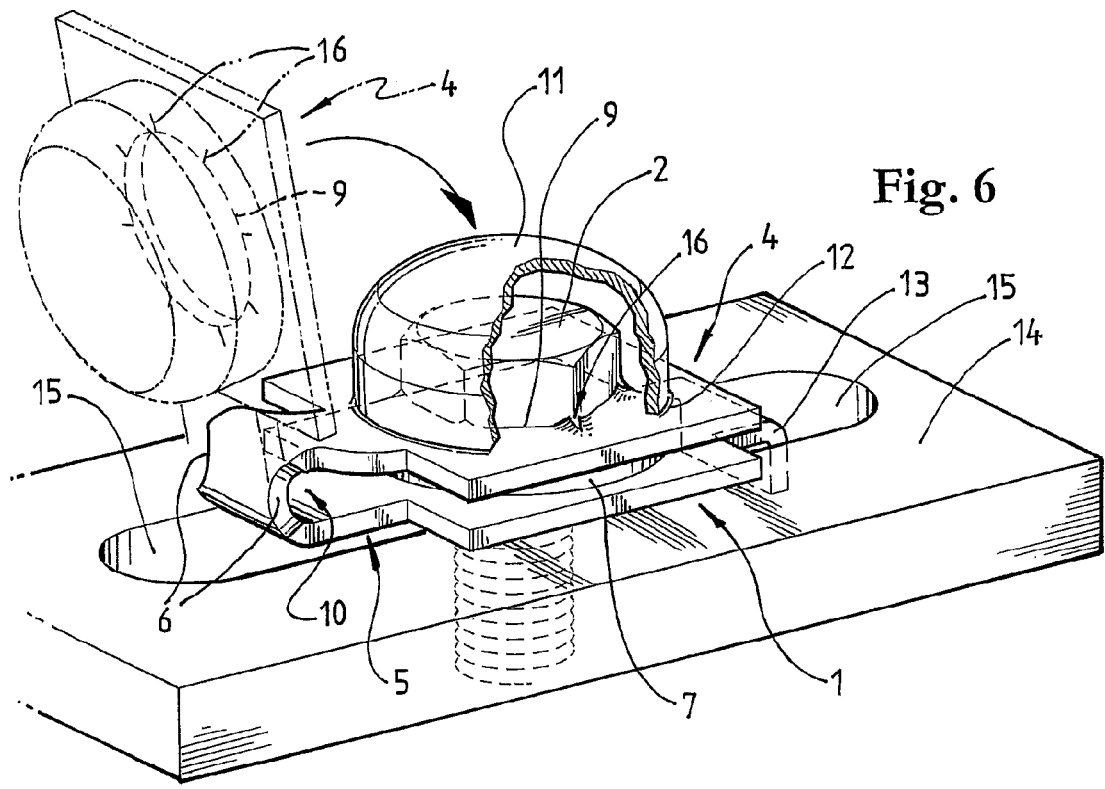

SWAGABLE WASHER LOCKING PLATE

BACKGROUND OF THE INVENTION

This invention relates to the secure fixing of nuts, bolts and the like, particularly in environments where such fixing means can work loose as a result of movement or interference. Such loosening can result in serious component failures and safety concerns. Such fixing means, particularly those in critical situations need to be locked in an efficient, simple but secure manner; most preferably, without specialised tools and single handed.

The use of the threaded nuts and bolts is a universally recognised fixing means for the diverse range of components. Such threaded fixing tools generally rely on friction at the thread interface to secure a nut or bolt in the "locked" position. However, vibration, temperature fluctuations and many other environmental factors can act on such fixtures and cause them to loosen.

A vast range of clips, locking pins and other mechanical means have been devised to address these problems. Chemical means are also available in the form of thread locking solutions which also serve to lock such fixtures by effectively gluing the threaded region common to both components of the fixture.

However, to date no complete solution to the above problem has been satisfactorily provided. In particular, when such fixtures are used with tilt-lift concrete panels and similar heavy construction elements, such components must be manipulated involving heavy lifting, bracing and fixing of large concrete panels and similar structures. The fixing, lifting and bracing of such panels generally relies on threaded fixtures which can work loose on such panels if they are caused to rock during assembly or when exposed to wind etc. Such an uncalculated motion can cause structural fixing elements to work loose. Similarly, temporary bracing used to support panels can be subjected to vandalism and unauthorised interference, or untrained use. A locking device adapted for use with standard fasteners which can be readily fitted, without specialised tools, by single handed operation and which allow ready visual inspection of the state of tightening of a fixture would provide great benefits.

SUMMARY OF THE INVENTION

Accordingly, in one aspect the invention provides a locking device for a rotational based fastener for fastening an object to a substrate said device comprising a washer adapted for placement between said fastener head and said object and a locking plate adapted for removable engagement to said fastener head and for cooperation therewith to prevent relative rotation of said locking plate and said fastener head wherein said locking plate and said washer are connected by a common portion being an integral foldable tab wherein said foldable tab is flexible but substantially non-elastic and said locking plate has a first aperture adapted to receive the shank of said fastener such that the fastener head will abut the washer face and upon tightening draw said washer into tight continuous contact with said substrate and wherein said locking plate is larger than said fastener head and has a second aperture of smaller or equal size than said fastener head, and wherein said locking plate includes a swagable portion positioned near the perimeter of said second aperture and configured to bridge said fastener head when said locking plate is swaged over said fastener.

The locking device is preferably of a unitary construction with a washer, foldable tab, locking plate and swagable portion, all formed in one integral piece.

The swagable portion is preferably formed in the shape of a cap, which is positioned over the second aperture and dimensioned so as to provide a means of swaging or applying pressure to the periphery of the second aperture as it is drawn down onto the head of the fastener.

The washer may be provided with a first aperture adapted to receive the shank of the fastener such that the fastener head will abut the washer face and upon tightening be drawn into tight contiguous contact with the substrate.

The locking plate may be provided with a second aperture of smaller size than said fastener head, wherein said locking plate must be forcibly fitted over said fastener head causing said aperture to distort in a manner to secure said locking plate onto the head thereof and prevent relative rotation between the head and the locking plate. The aperture may be circular and dimensioned to provide sufficient latitude to commence engagement with the fastener head, but require forcible fitting to fully engage said fastener head and once fitted over the head of the fastener prevent rotation thereof.

The locking device is preferably made from one piece and of unitary construction. The locking plate is preferably of greater dimension than the fastener head.

The second aperture formed in the locking plate is preferably circular and of a diameter between the major and minor diameter of said bolt head flats.

The foldable tab is preferably formed as a narrow waist region between the washer and locking plate. The foldable tab may include a transverse creasable region to assist in the bending of the device; but any such folding aids will add little or no elasticity to the foldable tab.

The invention will now be described with reference to the Legend and FIGS. 1 to 6 which detail particularly preferred embodiments of the invention and are not to be take as limiting.

Legend
1. Washer
2. Fastener Head
3. Object
4. Locking Plate
5. Foldable Tab
6. Crease Region
7. Standard Washer
8. First Aperture
9. Second Aperture
10. Loop
11. Swage
12. Rim
13. Tab
14. Connecting Plate
15. Slot
16. Slit

BRIEF DECRIPTION OF THE DRAWINGS

FIG. 5 Shows a perspective view of the locking device applied to a fastener.

FIG. 6 Shows the locking device applied to fasten a connecting plate to a substrate.

DETAILED DESCRIPTION OF INVENTION

Figure 1:
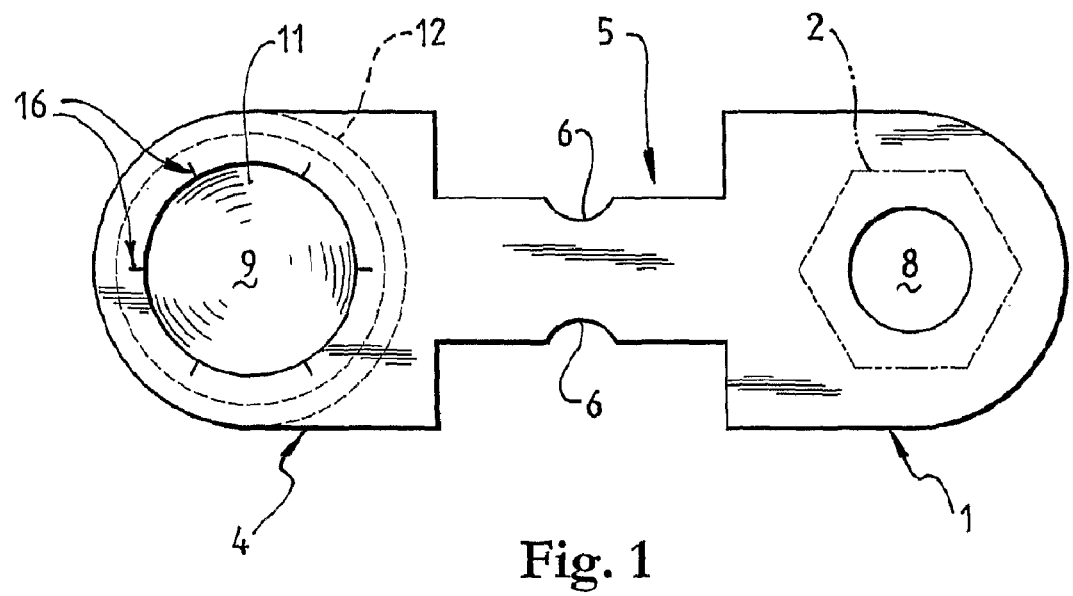
FIG. 1 Shows a plan view of the integral locking device in a first embodiment FIG. 2 Shows a plan view of the locking device in a second embodiment.
Figure 2:
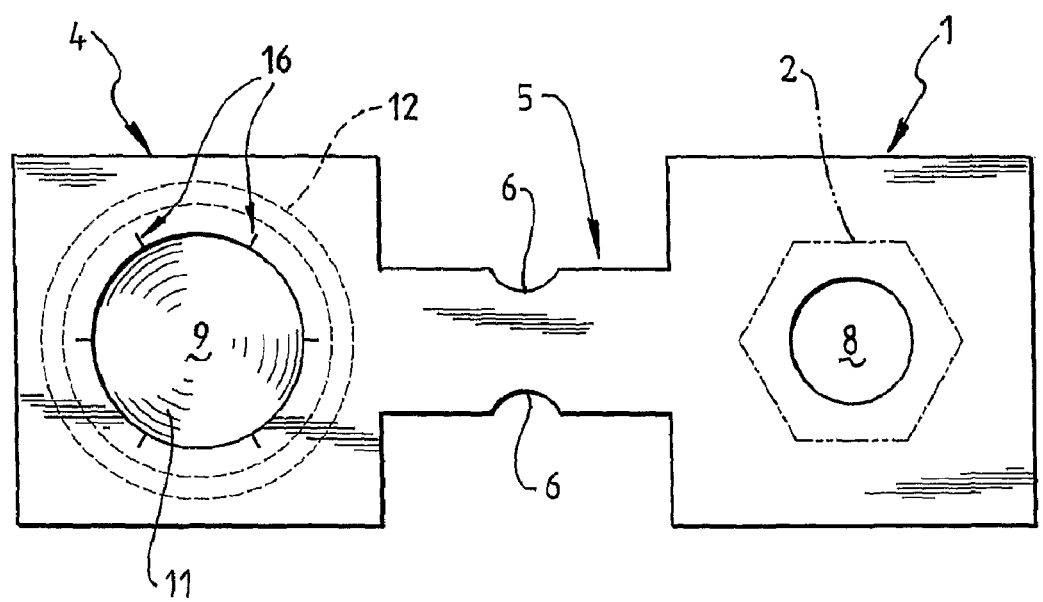

Referring firstly to FIGS. 1 and 2 an embodiment of the locking device of the invention is shown in two plan views where the locking device is adapted to co-operate with a rotation based fastener, for example, a bolt or nut or other threaded device having a fastener head (2), shown in phantom, and adapted for fixing an object to a substrate. The device comprises a washer (1) having an aperture (8) through which the shank of the fastener can pass such that the fastener head, once drawn down so as to bring the object into contact with the substrate, bears down on the washer face in the usual manner of operation of a washer. The device of the invention further comprises an integral locking plate (4) attached to the washer (1) by way of a foldable tab (5) having a foldable or crease region (6). The locking plate (4) is provided with a second aperture (9) dimensioned to allow forced fitting to and over the fastener head (2) with optional radial slits 16 assisting the fitting. The material of choice for the device is low carbon steel; but any suitably ductile and strong material could be used.

Figure 3:
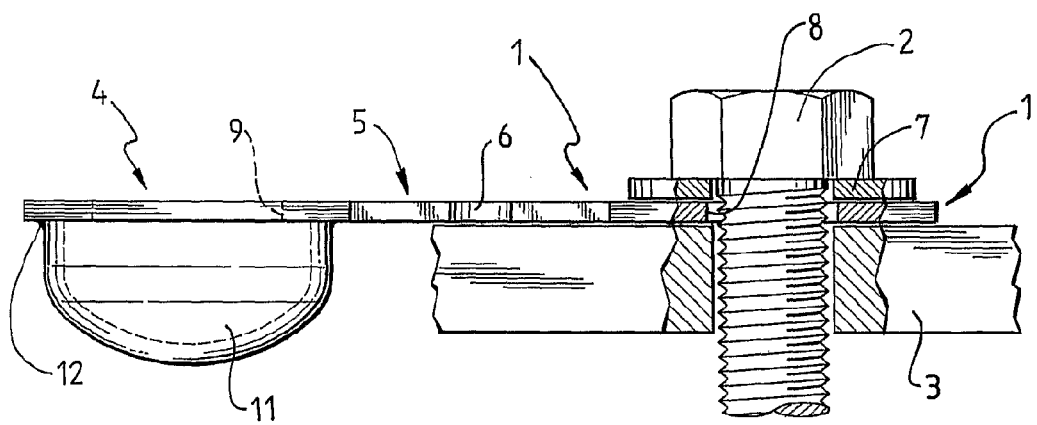
FIG. 3 Shows a side elevation of the locking device fitted to a fastener prior to locking down.
Figure 4:
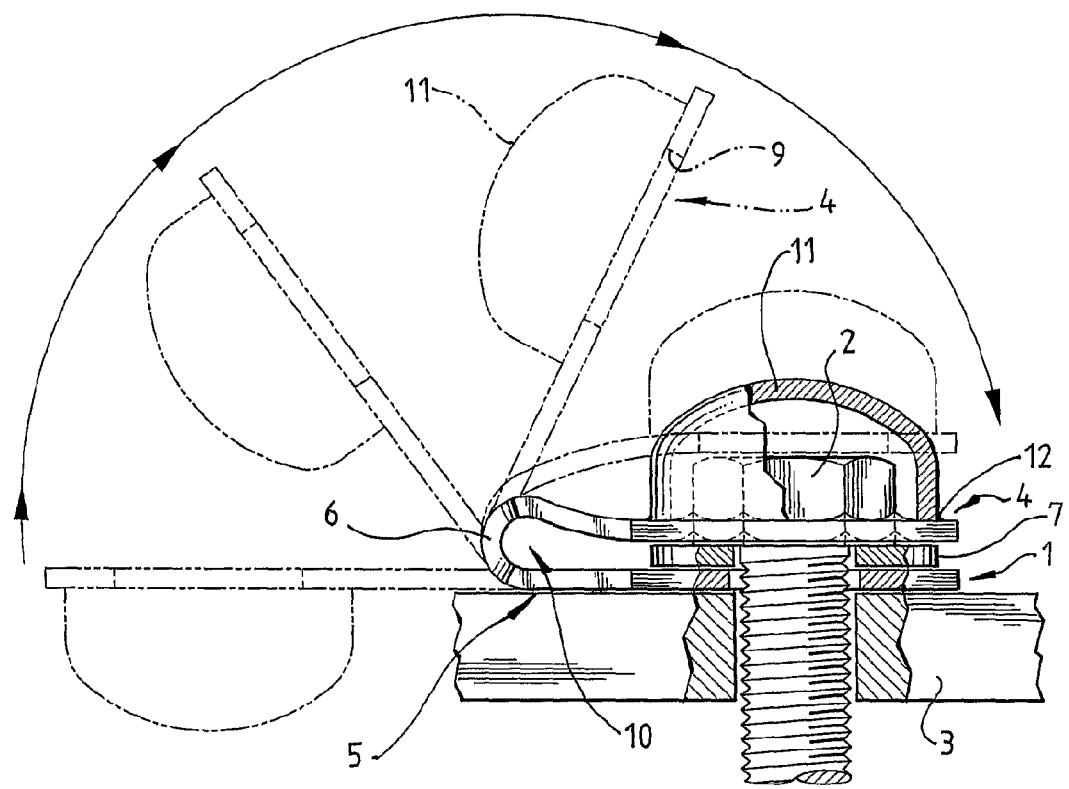
FIG. 4 Shows a side elevation of the locking device after locking down.

Referring now to FIGS. 3 and 4; in use, the locking device of the invention is fitted by placing the washer part on top of the object (3) to be fastened, and then securing the fastener head (2) onto the washer (1) through the first aperture (8). An optional standard washer (7) can be used between the device and the fastener if required. Once the fastener head is secured at the appropriate torque the locking plate (4) is drawn over by folding about the foldable tab (5) 180° such that the second aperture is placed onto and over the fastener head.

Once the locking plate is drawn over with the second aperture positioned against the top of the fastener (2), the locking plate is forced down onto and around the head of the fastener by deformation of the second aperture (9). This is effected by the use of a swaging operation where the integral swage (11) formed on the locking plate (4) is hammered down or otherwise pressed onto the head of the fastener so as to cause the aperture (9) to be deformed and swaged around the head of the fastener (2). The integral swage (11) avoids the need for the operator to use a specialised swaging tool or other improvisation in order to force the locking plate down onto the head of the fastener. The integral swage ensures uniform, even and secure application of the locking plate to the head of the fastener (2). The integral swage also has additional benefits in providing a captive housing for the head of the fastener once the locking device of the invention is applied. In this manner, the swage fully encloses the head of the fastening device and thereby offers additional security to the head of the fastener which is no longer vulnerable to unauthorised removal or vandalism, in addition to the principal benefit of the invention, which is to ensure that the fastener does not come undone unintentionally.

The second aperture is formed by way of a circular hole having a diameter less than the diameter of the diametrical spacing of the bolt head flats or the minor axis. In the example given, the fastener head is formed as a hexagonal bolt head or nut, with the major axis being the distance between opposing corners of the hexagonal fastener head and the minor axis being the distance between the opposing flats of the hexagonal fastener head. Most preferably, the diameter size of the second aperture is between the major and minor axis size of the bolt head flats. In this manner, the second aperture of the locking plate is able to be placed in juxtaposition to the fastener head, but requires forceful application in order to cause the locking plate to be drawn or impacted down onto the fastener head. The action of forcing the locking plate onto the fastener head causes the second aperture to distort and fully comply to the form of the fastener head. In this manner, once the locking plate is positioned to a fastener head, the combination of the non-elastic nature of the foldable tab (5) and the swaging effect of forcing the second aperture to distort, which has the fastener head acting a swage block, elongates and stretches the circular hole over the fastener head. The force and swaging result assists in snugly engaging the locking plate to the fastener head by way of the coning effect thereby ensuring that the locking plate is securely fixed to the fastener head and cannot work loose.

The application of the locking plate requires the use of minimal tools including a maul hammer and a tubular punch.

Referring now to FIG. 5, a perspective view of the applied locking device of the invention shows the simple and intuitive nature of the device and clearly demonstrates the swaging effect of the forced application of the locking plate to the fastener head. The combination of the non-elastic qualities of device's component material, which is preferably low carbon steel, and the coning effect of the forced application of the locking plate to the fastener head ensures that a secure, reliable and simplified locking device can now be applied to a wide range of situations The material used in the device can be selected from any suitable malleable material having the requisite strength and characteristics to allow bending without undue elasticity. In a particularly preferred embodiment the locking plate aperture may include a plurality of radial slits 16 to facilitate the distortion of the aperture over the bolt head. The device of the invention provides many advantages over all of the known prior art. In particular, the known prior art includes a range of hinged locking plates, which generally include pre-formed poly sided apertures for the locking plate, which do not require forced application to the fastener head and must be secured by other means to prevent them working loose. In addition, the pre-formed configuration of the receiving aperture of the locking plate requires that the fastener head be rotated to specifically provide for the application of locking plate. Such rotations may well over or under torque the fastener head. In contrast to these problems as experienced by the prior art, the device of the invention requires no movement of the fastener head beyond the optimum torqued position as the locking plate aperture is formed in situ during the application process as the locking head is forced onto the fastener head in its optimal position. A further advantage of the locking device of the invention over the prior art results from the loop region (10) formed as the foldable tab is bent over the crease region (6). The action of folding the foldable tab results in an open access loop (10) which is available to assist in removal of the locking device where a suitable tool or pry bar is placed into the access loop, allowing ready leverage of the locking plate away from the fastener head.

Referring now to FIG. 6, one further embodiment of the invention is demonstrated where the device of the invention incorporates a positioning tab 13 on the washer portion (1). This particular embodiment of the invention is adapted for use with heavy-duty connecting plates (14) of a type used particularly in cement slab constructions where a connecting plate incorporates a longitudinal slot (15) and is adapted for receiving fasteners to connect concrete slab units to supporting steel columns where one end of the connecting plate is bolted to a steel column and the other end is bolted to the concrete slab. Alternatively, the connecting plate may not be bolted and in order to avoid welding requirements a plastic tab may be incorporated with the ferrule cap to form a slot when the concrete panel is cast. In this particular embodiment, the locking device of the invention can incorporate an optional tab (13) for positioning within the slot (15) of the connecting plate (14) so as to ensure complete ease of operation as the fastener head (2) is initially drawn down upon the body of the washer (1). The tab (13) ensures that the washer does not rotate and remains perfectly aligned. Once the fastener is drawn down to the required torque, the locking plate can be drawn over and fastener locked in accordance with the previously described operation and use of the invention.

The device of the invention is principally intended for one off use, although recycling of the product is possible, providing the aperture of the locking plate is reinstated prior to re-use.

The invention provides for the first time a highly secure and simplified means for locking a fastening device in a manner that prevents the device from becoming loose during operation, installation or use. The device of the invention is simple and intuitive to use and can be operated single handedly without the use of specialised tools. Once the device is in place, it is readily visible and provides a means of visual inspection confirming that the fastener under inspection is tight and secure without the need to check physically each fastener.

Whilst the device of the invention provides a highly secure means of locking a fastening device, it is readily applied and removed without the use of specialised tools by the simple hammering of the swage to apply the locking effect to a fastener and the levering away of the locking plate from the fastener head if removal is required.

In addition, the locking device of the invention can be colour matched to particular fasteners or situations so as to assist in inspection of finished work.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A self swaging locking device for a rotational based fastener for fastening an object to a substrate, said device comprising:
   a washer adapted for placement between a fastener head of the fastener and said object,
   a locking plate adapted for removable engagement to the fastener head and for cooperation therewith to prevent relative rotation of said locking plate and the fastener head, and
   a common portion which connects said locking plate and said washer, said common portion including an integral foldable tab
   wherein said foldable tab is flexible but substantially non-elastic, and
   wherein said locking device has a first aperture adapted to receive a shank of the fastener such that the fastener head will abut a face of the washer and upon tightening draw said washer into tight continuous contact with the object, and
   wherein said locking plate is larger than the fastener head and has a second aperture of smaller or equal size than the fastener head, and
   wherein said locking plate includes an integral, one-piece swaging tool positioned near and circumnavigating a perimeter of said second aperture, said integral swaging tool being configured to bridge the fastener head when said locking plate is swaged over the fastener so as to facilitate swaging without the use of a separate swaging tool, and
   wherein a wall defining the second aperture of the locking plate includes a plurality of radial slits that results in distortion and swaging of the locking plate over the fastener head to prevent the fastener from unintentionally coming undone.

2. A locking device according to claim 1, wherein said washer, foldable tab and locking plate are formed from a single integral piece.

3. A locking device according to claim 1, wherein said washer, foldable tab, locking plate and swaging tool are formed from a single integral piece.

4. A locking device according to claim 1, wherein said swaging tool is formed in a general shape of a cap positioned over said second aperture.

5. A locking device according to claim 4, wherein said swaging tool is dimensioned to swage/apply pressure to a periphery of said second aperture as it is drawn down onto the head of the fastener.

6. A locking device according to claim 1, wherein said second aperture is of a smaller size than said fastener head, wherein said locking plate must be forcibly fitted over the fastener head causing said aperture to distort in a manner to secure said locking plate onto the head thereof and prevent relative rotation between the head and said locking plate.

7. A locking device according to claim 1, wherein said second aperture is circular and dimensioned to provide sufficient pressure to commence engagement with the fastener head, but require forcible fitting to fully engage the fastener head and once fitted over the head prevents rotation thereof.

8. A locking device according to claim 1, wherein said fastener head has a major axis and a smaller minor axis, and said second aperture is circular and of a diameter between dimensions of the major and minor axis.

9. A locking device according to claim 1, wherein said foldable tab is formed as a narrow waist region between said washer and said locking plate.

* * * * *